(12) United States Patent
Wuschko et al.

(10) Patent No.: US 11,865,790 B2
(45) Date of Patent: Jan. 9, 2024

(54) METHOD OF HEATING SEMI-FINISHED PRODUCTS

(71) Applicant: ENGEL AUSTRIA GmbH, Schwertberg (AT)

(72) Inventors: Stefan Wuschko, Linz (AT); Paul Zwicklhuber, Kremsmuenster (AT)

(73) Assignee: ENGEL AUSTRIA GMBH, Schwertberg (AT)

(*) Notice: Subject to any disclaimer, the term of this patent is extended or adjusted under 35 U.S.C. 154(b) by 1346 days.

(21) Appl. No.: 16/252,000

(22) Filed: Jan. 18, 2019

(65) Prior Publication Data
US 2019/0255781 A1 Aug. 22, 2019

(30) Foreign Application Priority Data

Feb. 21, 2018 (AT) .............................. A 50159/2018

(51) Int. Cl.
*B29C 65/32* (2006.01)
*B29C 71/02* (2006.01)
*B30B 11/00* (2006.01)
*B30B 15/06* (2006.01)
*C08L 83/04* (2006.01)

(52) U.S. Cl.
CPC .............. *B29C 65/32* (2013.01); *B29C 71/02* (2013.01); *B30B 11/002* (2013.01); *B30B 15/064* (2013.01); *C08L 83/04* (2013.01)

(58) Field of Classification Search
CPC ..... B29C 65/32; B29C 71/02; B29C 43/3642; B29C 43/10; B29C 2035/0283; B29C 2035/0822; B29C 35/0805; B29C 35/02; B29C 35/00; B29C 70/54; B30B 11/002; B30B 15/064; C08L 83/04; B29B 2013/026; B29B 13/023; B32B 37/06
See application file for complete search history.

(56) References Cited

U.S. PATENT DOCUMENTS

| | | | |
|---|---|---|---|
| 9,498,915 B2 | 11/2016 | Bartel et al. | |
| 10,293,542 B2 | 5/2019 | Bamford et al. | |
| 10,293,549 B2 | 5/2019 | Zwicklhuber et al. | |
| 2014/0004308 A1 | 1/2014 | Taniguchi et al. | |
| 2014/0183784 A1* | 7/2014 | Bartel | B29C 70/50 264/258 |
| 2015/0375444 A1 | 12/2015 | Bamford et al. | |

(Continued)

FOREIGN PATENT DOCUMENTS

| | | |
|---|---|---|
| CN | 202623270 | 12/2012 |
| CN | 106079390 | 11/2016 |

(Continued)

*Primary Examiner* — S. Behrooz Ghorishi
(74) *Attorney, Agent, or Firm* — Wenderoth, Lind & Ponack, L.L.P.

(57) ABSTRACT

A method involves heating fiber-reinforced semi-finished products of differing wall thickness to a required temperature above the glass transition range or the matrix melting temperature of a plastic matrix of the semi-finished product to be heated. In a first step, the semi-finished product to be heated is heated by thermal conduction to below the glass transition range or the matrix melting temperature. In a further step, the remaining amount of heat for reaching the required temperature above the glass transition range or the matrix melting temperature is introduced by thermal radiation or thermal convection.

7 Claims, 1 Drawing Sheet

(56) References Cited

U.S. PATENT DOCUMENTS

2016/0339647 A1 11/2016 Matsen et al.
2017/0080635 A1 3/2017 Zwicklhuber et al.
2018/0104866 A1* 4/2018 Owens ................ B29C 35/0805

FOREIGN PATENT DOCUMENTS

| | | | |
|---|---|---|---|
| CN | 106536161 | 3/2017 | |
| CN | 106541524 | 3/2017 | |
| DE | 198 03 965 | 8/1999 | |
| DE | 19803965 A1 * | 8/1999 | ............. B29C 49/22 |
| DE | 102009024789 | 12/2010 | |
| DE | 102015103369 | 9/2016 | |
| EP | 2 674 447 | 12/2013 | |
| ES | 2 281 269 | 9/2007 | |

* cited by examiner

METHOD OF HEATING SEMI-FINISHED PRODUCTS

BACKGROUND OF THE INVENTION

The present invention concerns a method and an apparatus for heating fiber-reinforced semi-finished products of differing wall thickness, and a heating arrangement having such an apparatus.

In order to be able to implement lightweight engineering and design, fiber-reinforced plastics are being increasingly used. In that respect great significance is attributed to back injection or functionalization of unidirectionally fiber-reinforced plastics (tapes) or organic sheets.

By way of example, when processing tapes in a tape laying process, various tapes of differing lengths, widths and of differing orientations are laid down and fixed together. The mechanical properties of that laid tape material are determined by the individual fiber orientations of the tapes. In that way the tape laying process can be used to build up a semi-finished product which then meets the required demands.

That configuration which is appropriate in terms of load path leads in most cases to semi-finished products, with a differing thickness profile. In order to be able to remodel such a semi-finished product the semi-finished product has to be heated to a temperature above the glass transition temperature of the thermoplastic material of the plastic matrix of the tapes. The use of electromagnetic radiation, in particular infra-red radiation for heating thermoplastic semi-finished products and films is state of the art. In that respect electromagnetic radiation is emitted by at least one radiation source. That radiation is absorbed by the semi-finished product to be heated up. Absorption occurs primarily near the surface where the electromagnetic radiation penetrates. The depth of penetration and the extent of absorption are dependent on the chemical structure of the semi-finished product. After absorption of the heat radiation the thermal energy is transported and distributed by means of thermal conduction in the semi-finished product. A uniform distribution of the heat quantity in a semi-finished product is essential in order to achieve a uniform temperature. As plastics are generally poor heat conductors and the absorbed radiant energy decreases with increasing spacing relative to the emitting radiation source it is indispensable for homogeneous heating that the spacing between the radiation source and the absorbing semi-finished product is kept constant.

If a semi-finished product involves a plurality of wall thicknesses then homogeneous heating by means of infra-red radiation is extremely difficult. On the one hand the spacing relative to the radiation source is to be constant and on the other hand regions involving a larger/smaller wall thickness require an increased/reduced amount of heat. In order to permit homogeneous heating each wall thickness of the semi-finished product would have to have its own dedicated temperature control zone and a radiation medium which is precisely matched to the contour.

Those demands are generally not viable. On the one hand the radiation medium cannot be accurately matched to the contour. On the other hand that would result in many temperature control zones which in turn all influence each other. The result of this is that a stable reproducible control process is not possible.

So that heating of semi-finished products with abrupt variations in wall thickness is possible in practice in spite of those problems control of the temperature is effected by monitoring the temperature at the critical location or locations (these are those locations at which there is a threat of overheating). The consequence of this is that the overall control of the heating time and the heating power is based on the thin regions which reach the set control temperature more rapidly than the thicker regions. As a result the overall cycle time is increased as regions involving thicker wall thicknesses, as from the moment at which the thinner region has reached the control value, then only receive that heating power in order to protect the thinner regions from overheating. Accordingly in regard to the control procedure the semi-finished product is considered as a semi-finished product without changes in wall thickness, and for this reason the temperature distribution in regions of differing wall thickness lacks homogeneity.

SUMMARY OF THE INVENTION

The object of the invention is to provide a method, an apparatus, and a heating apparatus which in comparison with the state of the art, permit heating of a semi-finished product, that is independent of geometry and wall thickness thereof, in order to achieve a substantially better temperature distribution and a reduction in the length of the overall cycle time.

The invention involves various mechanisms in respect of heat transfer. In the first step that involves the introduction of heat by means of thermal conduction (contact heating), and in the second step the introduction of heat by thermal radiation (preferably infra-red radiation) or convection.

In order to be able to remodel a thermoplastic semi-finished product (semi-finished product with a thermoplastic matrix) at least so much heat energy has to be applied that, in the case of amorphous plastics, at least the glass transition range or, in the case of part-crystalline plastics, at least the matrix melting point, is reached. In order to permit faster and homogeneous heating the heating operation is divided into at least two process steps which are preferably carried out in two different apparatuses which can form heating stations of a heating apparatus.

In the first step, the semi-finished product to be heated is firstly put into an apparatus according to the invention and heated by means of thermal conduction to below the glass transition range or the matrix melting temperature. To achieve a temperature distribution which is as homogeneous as possible in the semi-finished product all abrupt changes in thickness in the semi-finished product also have to be taken into account in the apparatus. In that way it is possible to ensure uniform introduction of heat, and this results in a homogeneous temperature distribution in the semi-finished product. That permits a flexible thermal conduction layer which has the capability of adapting to the surface of the semi-finished product.

A further step involves transfer into an apparatus in which the remaining amount of heat for reaching the required temperature above the glass transition range or the matrix melting temperature is introduced by means of thermal radiation. The transfer must naturally be effected before substantial cooling of the semi-finished product has taken place. As in the preceding process step a large part of the amount of heat which is required for capability of remodelling has already been introduced, a semi-finished product of differing wall thicknesses can be viewed as being even in relation to the introduction of heat by thermal radiation or thermal convection. By virtue of the fact that the greatest amount of heat is introduced in the first step an extraordinarily homogeneous temperature is produced over the cross-section or the surface. In the further step of introducing heat by means of thermal radiation or thermal convection that affords the advantage that only a small amount of heat still has to be introduced and thus temperature homogeneity is maintained. Furthermore a substantially shorter heating time is possible by virtue of dividing the process or method into a multi-stage method.

If the semi-finished product is a matrix material comprising a technical plastic the semi-finished product is preferably heated to a temperature of up to 50° C. below the glass transition range or the matrix melting temperature, particularly preferably to a temperature which is up to 30° C. below the glass transition range or the matrix melting temperature. If the semi-finished product is a high-temperature plastic it can also happen that the temperature is more than 50° C. below the glass transition range or the matrix melting temperature.

The apparatus comprises an upper and a lower tool half which each comprises a heatable base plate and a flexible thermal conduction layer in the form of a flexible tool insert. There is the possible option of exerting pressure on the semi-finished product by way of the two tool halves, for optimum heat transfer between the insert and the semi-finished product. The base plate and the counterpart plate are preferably arranged in movable axial relationship with each other so that an opening and closing movement can be performed and a force can be applied to a semi-finished product placed on the base plate.

In a preferred embodiment of the invention the base plate is designed to be immobile and the counterpart plate is designed to be axially movable.

In an alternative configuration the counterpart plate is immobile and the base plate is designed to be axially movable.

Alternatively it is also possible for the two plates to be designed to be movable relative to each other.

The base plate which is heated and transports the heat to the flexible insert by means of thermal conduction has particularly high thermal conductivity.

The flexible thermal conduction layer comprises a material which can compensate for differences in wall thickness of a few millimeters, preferably less than 5 millimeters, particularly preferably less than 3 millimeters.

Preferably elastomers, particularly preferably silicones, are used as the material for same.

In order to increase the thermal conductivity of the flexible thermal conduction layer it can be filled with fillers. Depending on the respective situation of use the flexible thermal conduction layer can be of a compact volume or can be of an open-pore or closed-pore volume. Alternative embodiments can be implemented by means of a fluid, a fine material (aluminum powder, glass dust and so forth) which is encapsulated with a membrane or another material which is flexible and thermally conductive.

For optimum use of the construction space, in an embodiment of a heating apparatus according to the invention, the apparatus for introducing the amount of heat by means of thermal conduction (first heating station) is preferably disposed above the apparatus for introducing the amount of heat by means of thermal radiation or thermal convection (second heating station).

A method of heating a semi-finished product with a heating apparatus as described above is carried out for example as described hereinafter:

The semi-finished product to be heated is placed on the flexible/shapable thermally conductive tool insert. The base plate and the counterpart plate are then moved relative to each other and the apparatus is thus moved into the closed state. In that respect the closing movement can be effected by displacement of the counterpart plate, the base plate or both plates.

Preferably, a defined pressure is exerted on the semi-finished product to be heated by the closing movement. That pressure serves to fix the semi-finished product, to adapt the flexible insert to the contour thereof and further to improve heat transfer. As the plates are preferably constantly heated the heating procedure begins as soon as the plate touches the semi-finished product.

The heating operation is carried out for a given time and depends on the required time for heating the semi-finished product therethrough for the thickest region. The through-heating time can for example be so selected that the temperature distribution in the thickness profile of the semi-finished product varies by less than 10° C., preferably less than 5° C.

The control temperature is dependent on the matrix material of the plastic matrix of the semi-finished product to be heated and is below the glass transition range or the matrix melting point of the plastic.

After the heating time has elapsed the pre-heated, still warm semi-finished product is introduced into the second heating station for applying the amount of heat by means of thermal radiation or thermal convection. In that station the semi-finished product is heated to a temperature above the glass transition range or the matrix melting temperature. After the control temperature is reached the temperature is still maintained for a certain time so that the entire cross-section is uniformly heated. That time is adjustable and dependent on the thickness of the semi-finished product.

DETAILED DESCRIPTION OF THE INVENTION

Figure 1:
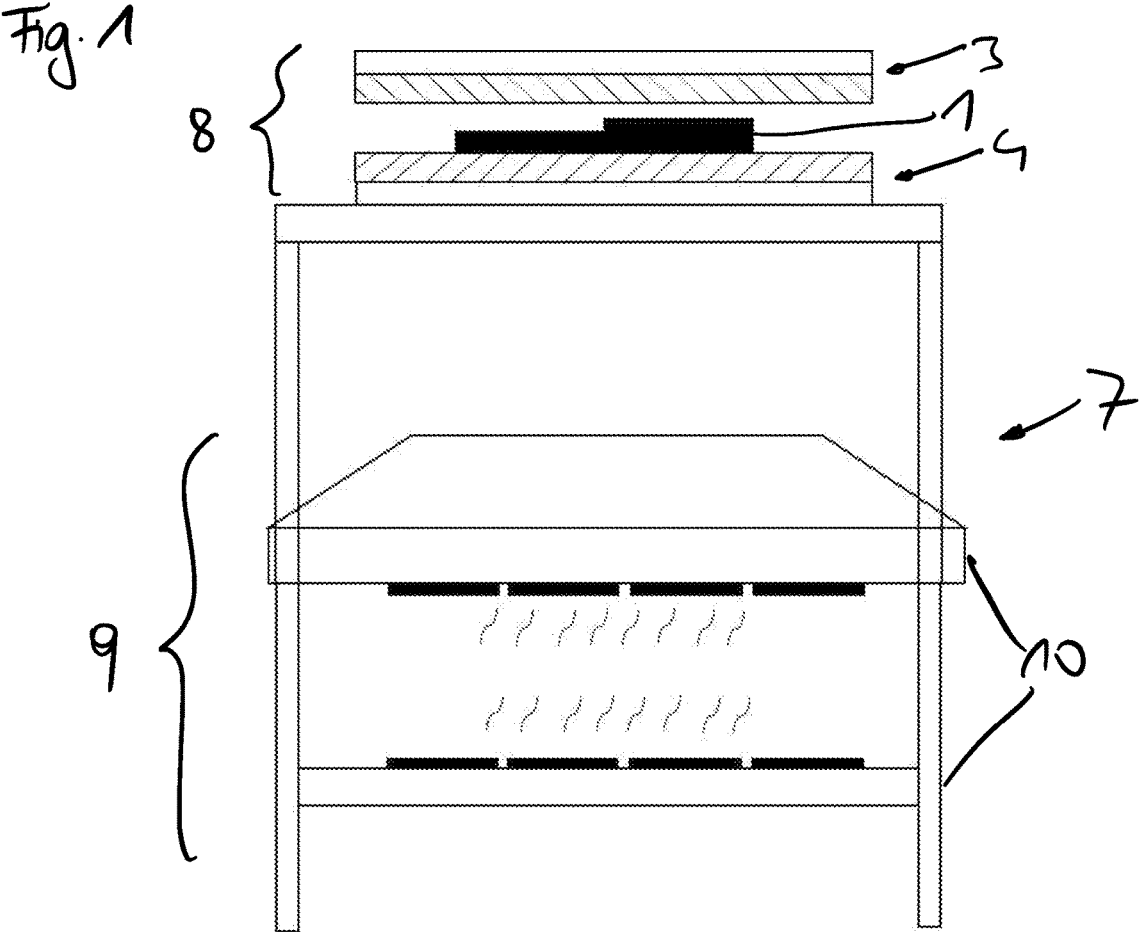
FIG. 1 is a schematic view of a heating apparatus according to the invention.
Figure 2A:
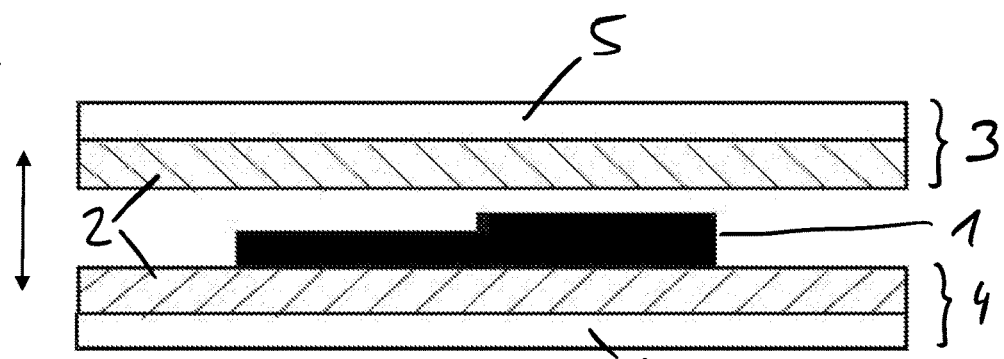
FIG. 2a is a schematic view of a first heating station according to the invention.
Figure 2B:
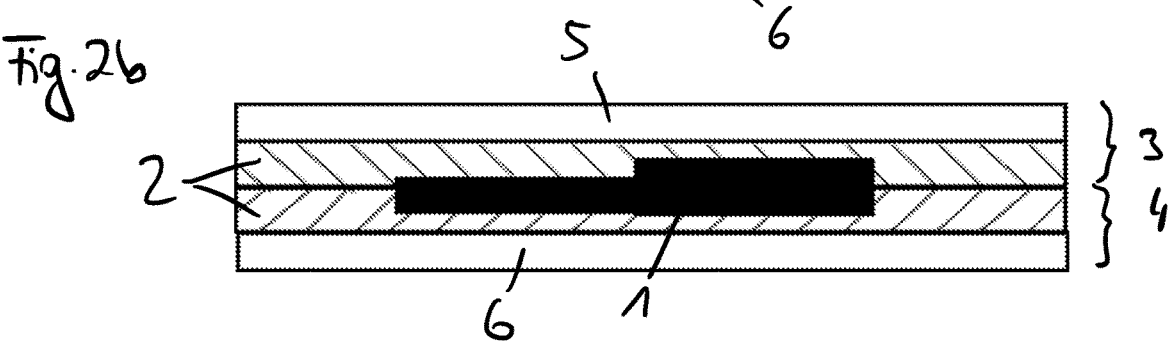
FIG. 2b is another schematic view of the first heating station.

A heating apparatus according to the invention is shown in FIGS. 1, 2a and 2b.

The heating apparatus 7 has a first heating station 8 and a second heating station 9. The second heating station 9 serves for introducing heat by means of thermal radiation or thermal convection. It has two plates 10, between which the semi-finished product 1 can be placed after pre-heating in the first heating station, and does not have to be described in greater detail as it corresponds to the state of the art. The plates 10 can have known heating elements.

The first heating station 8 is shown in FIG. 2a in an opened position and in FIG. 2b in a closed position. The first heating station 8 has a first (upper) tool half 3 and a second (lower) tool half 4. They each comprise a heatable base plate 5, 6 respectively and a flexible thermal conduction layer 2 arranged thereon (i.e., on a surface of the respective heatable base plate). The devices required for heating the base plates 5, 6 are not shown as they correspond to the state of the art.

By comparison between FIGS. 2a and 2b, it is possible to see how the flexible thermal conduction layer 2 adapts to differences in wall thickness of the semi-finished product 1 to be heated. Instead of providing a flexible thermal conduction layer 2 on both tool halves 3, 4 as here, the provision of only one flexible thermal conduction layer 2 on one of the two tool halves 3, 4 could also be sufficient. The flexible thermal conduction layer or layers 2 would not necessarily have to be in one piece, other than as illustrated.

LIST OF REFERENCES

1 semi-finished product
2 flexible thermal conduction layer
3 first tool half
4 second tool half
5 base plate of the first tool half
6 base plate of the second tool half
7 heating apparatus
8 first heating station
9 second heating station
10 plates of the two heating stations

The invention claimed is:

1. An apparatus for heating fiber-reinforced semi-finished products of differing wall thicknesses, the apparatus comprising:
    a first tool half having a first heatable base plate; and
    a second tool half having a second heatable base plate, each of the semi-finished products to be arranged between the first tool half and the second tool half to be heated,
    wherein at least one of the first tool half and the second tool half has a flexible thermal conduction layer adaptable to differences in wall thickness of the semi-finished products to be heated, the flexible thermal conduction layer being configured to transmit heat energy by thermal conduction to the semi-finished products to be heated, and
    wherein the flexible thermal conduction layer is arranged on a surface of at least one of first heatable base plate of the first tool half and the second heatable base plate of the second tool half so as to be located on the surface of the at least one of the first heatable base plate of the first tool half and the second heatable base plate of the second tool half in both an open position and a closed position of first tool half and the second tool half.

2. The apparatus as set forth in claim 1, further comprising a pressing device for pressing the flexible thermal conduction layer against each of the semi-finished products to be heated so that the flexible thermal conduction layer bears against a surface of the semi-finished products to be heated.

3. The apparatus as set forth in claim 2, wherein the pressing device includes the first tool half and the second tool half movable relative to each other to generate a pressing effect.

4. The apparatus as set forth in claim 1, wherein the flexible thermal conduction layer is a vacuum mat configured to retain a shape by applying a vacuum thereto after the flexible thermal conduction layer has been applied to a surface of the semi-finished products.

5. The apparatus as set forth in claim 1, wherein the flexible thermal conduction layer comprises an elastomer.

6. The apparatus as set forth in claim 5, wherein the flexible thermal conduction layer comprises a silicone, and has fillers for increasing thermal conductivity.

7. A heating apparatus comprising a first heating station comprising the apparatus as set forth in claim 6, and a second heating station configured to heat by thermal radiation or thermal convection the semi-finished products preheated in the first heating station.

* * * * *